United States Patent [19]  [11] 4,352,138
Gilker  [45] Sep. 28, 1982

[54] BACKUP TRIP CIRCUIT FOR A CIRCUIT BREAKER

[75] Inventor: Clyde Gilker, South Milwaukee, Wis.

[73] Assignee: McGraw-Edison Company, Rolling Meadows, Ill.

[21] Appl. No.: 210,318

[22] Filed: Nov. 25, 1980

[51] Int. Cl.³ .............................................. H02H 3/24
[52] U.S. Cl. ........................................ 361/92; 361/93
[58] Field of Search ....................... 361/92, 93, 94, 98; 307/200 A

[56] References Cited

U.S. PATENT DOCUMENTS

| | | | |
|---|---|---|---|
| 3,386,006 | 5/1968 | Runge | 317/31 |
| 3,590,325 | 6/1971 | McMillen et al. | 361/92 |
| 3,740,738 | 6/1973 | Kosanovich et al. | 361/92 X |
| 3,769,550 | 10/1973 | Lee | 317/33 SC |
| 3,803,455 | 4/1974 | Willard | 361/96 X |
| 3,843,908 | 10/1974 | Priegnitz | 317/31 |
| 4,027,203 | 5/1977 | Moran et al. | 361/98 |

Primary Examiner—Reinhard J. Eisenzopf
Attorney, Agent, or Firm—Jon Carl Gealow; Thomas E. McDonald; Hugh M. Gilroy

[57] ABSTRACT

A backup trip circuit is provided for an electronically controlled recloser or circuit breaker which requires a constant voltage direct current supply for its normal tripping circuit. Whenever the normal DC supply voltage drops below the minimum level, a capacitor is coupled to and charged by the distribution line current. Then, whenever the line current exceeds a selected magnitude for a selected period of time, the capacitor is discharged through the trip coil of the breaker to open this distribution line.

12 Claims, 2 Drawing Figures

4,352,138

BACKUP TRIP CIRCUIT FOR A CIRCUIT BREAKER

BACKGROUND OF INVENTION

This invention relates generally to circuit breaker control circuits, and, more particularly, to a backup direct current power supply and trip control circuit combination for opening an electronically controlled breaker or recloser upon the occurrence of a line overcurrent condition in the event that the voltage of the normal direct current power supply is less than the minimum operating voltage of the normal electronic trip control circuit.

As is known, the electronic trip control circuit of a high power circuit breaker generally requires a source of constant potential direct current energy. Typically this source is also used to supply power to the trip coil of the circuit breaker. In the event this direct current source fails while the circuit breaker is closed, the distribution line on the load side of the breaker is not adequately protected should an overcurrent or fault condition occur. To remedy this potential problem, a secondary direct current power source is provided in addition to the normally, used direct current source. In such systems, undervoltage relays are employed to connect this secondary direct current power source to the circuit breaker trip control circuits whenever the voltage of the normal direct current power supply falls below the minimum operating voltage required by the circuit breaker trip control circuits. In some systems, the preferred source is the rectified and regulated output of a control transformer having a primary winding coupled to one of the high voltage distribution lines, and the secondary direct current source is a station battery. However, of course, secondary direct current source must be properly maintained or failure of the normal direct current supply may occur when the secondary direct current supply is inoperative. In this event, the distribution line on the load side of a circuit breaker is not protected against overload or fault conditions. Therefore, it is an object of the present invention to provide a back-up trip circuit which, upon the failure of the preferred and secondary DC power sources, detects a line overcurrent condition, and utilizes line current to provide the direct current power required to trip the breaker.

U.S. Pat. No. 3,590,325, issued on June 29, 1971 to McMillen, discloses a circuit for sensing an undervoltage condition of the circuit breaker control power supply. Upon sensing this low voltage condition, a voltage sensitive relay causes the main circuit breaker to open (if it is closed) using current from a previously charged capacitor. Concurrently, the voltage sensitive relay disconnects the main power supply from the spring released closing coil of the circuit breaker, to prevent the circuit breaker from being closed while the voltage of the normal control circuit power supply is below its minimum operating level. As a result, the described circuit protects the distribution line on the load side of the circuit breaker against overcurrent or fault conditions which may occur while the circuit breaker control power supply is inoperative. While the described system provides improvement, many unnecessary interruptions of the distribution line can result. Therefore, it is another object of the present invention to disclose a backup trip circuit which, upon the failure of the normal direct current power supply, will trip the circuit breaker only when an overcurrent or fault condition occurs on the distribution lines supplied by the breaker.

In other electronically controlled circuit breakers such as those described in U.S. Pat. No. 4,027,203, issued May 31, 1977, to Moran et al, and U.S. Pat. No. 3,803,455, issued Apr. 9, 1974, to Willard, the normal direct current supply for the breaker trip coil and the breaker trip control circuit is generated by the current flowing in the distribution line on the load side of the breaker. In the systems shown, individual current transformers are coupled to each phase of the distribution line to be protected from overcurrents. The secondary current of each current transformer is rectified by individual single phase, full wave, rectifier bridge which charge a power supply capacitor. The capacitor voltage is maintained nearly constant by a parallel zener diode. Once the capacitor is fully charged, it provides a constant voltage, direct current supply for the circuit breaker control circuits. The latter are also coupled to the current transformers in order to sense distribution line overcurrents. Should a line overcurrent condition occur, the power supply capacitor is discharged through the trip coil of the circuit breaker. Once the open breaker is reclosed, the power supply capacitor must be recharged before another trip operation can be initiated. The time required to trip the circuit breaker when it is closed into a fault is therefor greater than the time required to trip the circuit breaker when the power supply capacitor has been fully charged. It is therefor a further object of the present invention to provide a system in which the backup trip circuit only becomes operative upon the failure of a normal, constant voltage DC power source, wherein the circuit breaker can be closed only when the voltage level of the normal direct current source reaches a selected minimum level.

DESCRIPTION OF A PREFERRED EMBODIMENT

Figure 1:
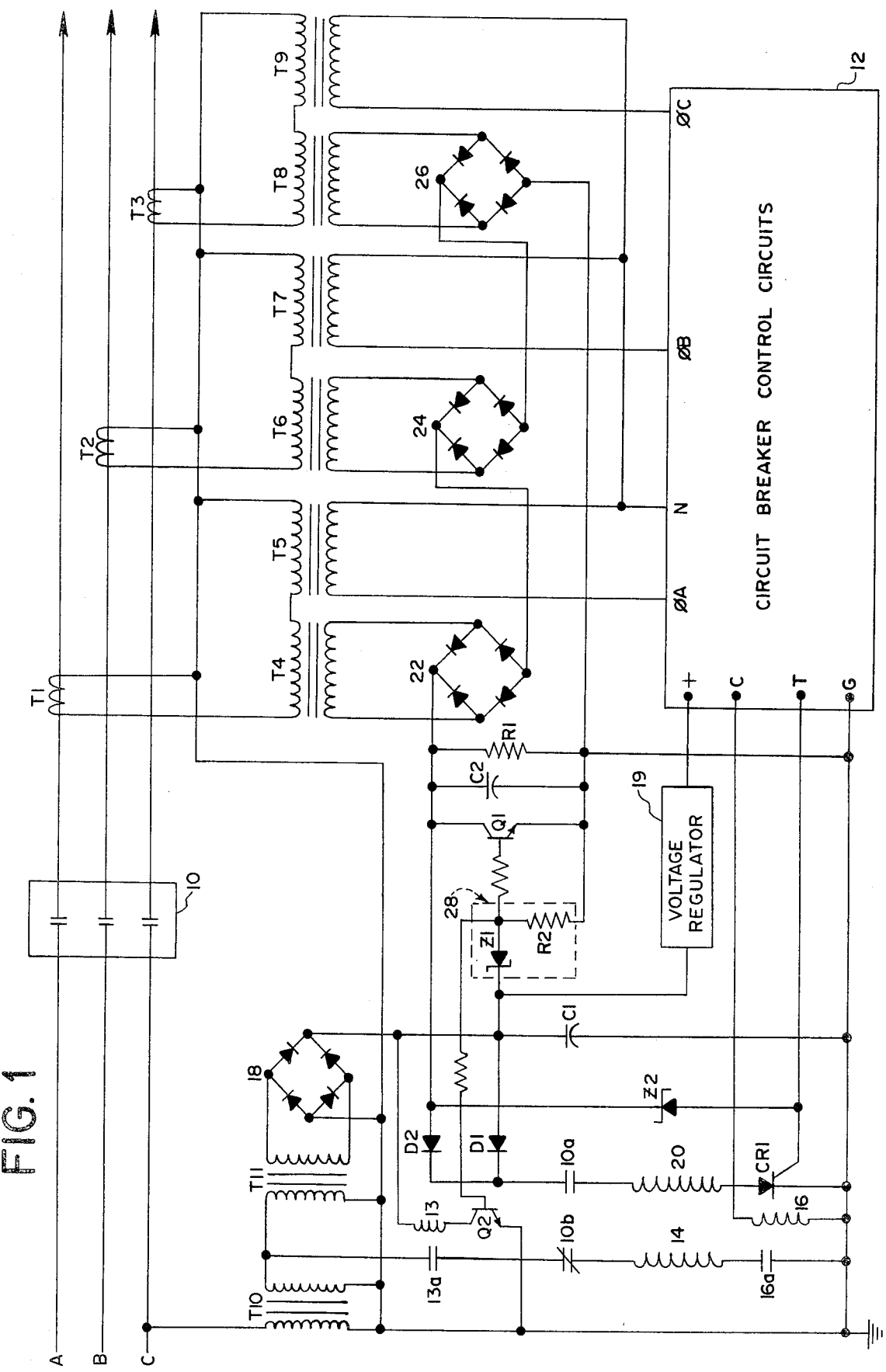
FIG. 1 is a schematic wiring diagram of a preferred embodiment of the invention, for use with an electronically controlled circuit breaker or recloser of a three phase distribution system.

Referring now to the drawing FIG. 1 a circuit breaker or recloser 10 for a three phase power distribution line is controlled by electronic circuit breaker control circuits 12, which are similar to those described in the above-referenced U.S. Pat. Nos. 3,803,455 and 4,027,203, and which require a constant voltage, direct current supply for proper operation. A trio of wye connected current transformers T1, T2, T3, are coupled to respective phase conductors on the load side of the circuit breaker 10 and thereby supply currents which are each proportional to the respective distribution line phase currents. These current transformers are each connected to a primary winding of backup power supply transformer T4, T6, T8, and to a primary winding of one of the breaker control circuit transformer T5, T7, T9. The primary windings of the transformers T4 and T5 are series connected across the secondary winding of the current transformer T1 which is coupled to the phase A distribution line; while the primary windings of the transformers T6 and T7 are series connected across the secondary winding of the current transformer T2 which is coupled to phase B distribution line; and, the primary windings of the transformers T8 and T9 are series connected across the secondary winding of the current transformer T3, which is coupled phase C distribution line.

A control power transformer T10 has a primary winding connected between one of the phase distribution lines (phase C in this case) on the source side of the circuit breaker 10 and ground. A secondary winding of transformer T10 has one side grounded, and the other coupled through a normally open contact 13a of a relay 13 and a normally closed auxiliary contact 10b of the circuit breaker 10 to the side of the circuit breaker closing coil 14. The other side of this closing coil 14 is connected through a normally open contact 16a of a closing relay 16 to ground. The secondary winding of the transformer T10 is also connected across the primary winding of a power supply transformer T11. A single phase full wave rectifier bridge 18 has its AC inputs connected across the secondary winding of the transformer T11 and its negative DC output connected to ground. The DC voltage output of the rectifier bridge 18 is smoothed and regulated by at least one capacitor C1 connected across the DC outputs of this bridge 18 and a voltage regulator 19 connected between the rectifier bridge 18 and the circuit breaker control circuits 12 to serve as a constant voltage, direct current power supply for these control circuits 12. The positive DC output of the rectifier bridge 18 is connected through a blocking diode D1 and a normally open circuit breaker auxiliary contact 10a to one side of the breaker trip coil 20. The opposite side of this breaker trip coil 20 is connected to the anode of a silicon controlled rectifier CR1 whose cathode is connected to ground. The gate of this semiconductor control rectifier is connected to the trip control circuit of the circuit breaker electronic controls 12.

Each single phase full wave rectifier bridge 22, 24, 26, is connected across the secondary winding of a respective backup power supply transformer T4, T6, T8, and the DC outputs of these three bridges 22, 24, 26 are connected in series across a capacitor resistor network, shown in the FIG. 1 as a single capacitor C2 connected in parallel with a resistor R1. These DC outputs provide a direct current signal having an instantaneous peak value each half cycle proportional to the instantaneous peak value of the maximum phase current of said protected circuit. A DC voltage sensing circuit 28, which produces a positive DC voltage output whenever the voltage across its inputs exceeds a predetermined minimum level, has its input connected to the DC output of the normal trip circuit power supply rectifier bridge 18 and its DC output connected to the base of a NPN transistor Q1 having its collector connected to the positive side of the capacitor C2, and its emitter connected to the negative side of this capacitor C2 and to ground. In the FIG. 1, the DC undervoltage circuit 28 is shown as a zener diode Z1 connected in series with a resistor R2 across the DC output of the rectifier bridge 18, with the juncture of the zener diode Z1 and the resistor R2 being connected to the base of the transistor Q1. The output of the undervoltage circuit 28 is also connected to the base of another NPN transistor Q2, which has its emitter connected to ground and its collector connected through the operating coil of the relay 13 to the positive DC output of the rectifier bridge 18.

The circuit breaker control circuits 12 include phase and ground overcurrent pickup circuits which are coupled to the current transformers T1, T2, and T3 to receive a signal proportional to the respective phase and ground currents flowing in the distribution line. Upon the occurrence of the phase or ground overcurrent, at least one of these pickup circuits activates a respective timing circuit, which after a time delay inversely proportional to the phase or ground overcurrent activates a trip signal output circuit which supplies a trip signal to the trip circuit terminal T connected to the gate of the silicon controlled rectifier CR1, to turn on this controlled rectifier CR1. These pickup, timing and output circuits are circuits which are well-known in the art, as for example, the circuits described in the prior-referenced U.S. Pat. Nos. 3,803,455 or 4,027,203, and therefore, are not described in detail herein.

When the controlled rectifier CR1 is turned on, the breaker trip coil 20 is connected across the DC output of the rectifier bridge 18 to trip the circuit breaker 10. When the circuit breaker 10 is tripped, the normally open auxiliary contact 10a opens to disconnect the trip coil 20.

The constant voltage direct current supply required by the electronic breaker control circuits 12 and the direct current power supply required to operate the trip coil 20 is normally supplied by the DC output of the rectifier bridge 18. When the voltage of the DC output of the rectifier bridge 18 is above the minimum DC voltage level required for the proper operation of the breaker control circuits 12 and the trip coil 20, the zener diode Z1 of the undervoltage sensing circuit 28 will conduct to allow a direct current to flow from the positive DC output of the rectifier bridge 18 through the zener diode Z1 and the resistor R2 to ground and also into the base of the transistor Q1. So long as this current signal is supplied to the base of the transistor Q1, this transistor will be switched on, to allow current flow between its collector and emitter terminals which are connected in parallel with the capacitor C2 and the resistor R1 across the output of the rectifier bridges 22, 24 and 26. Thus, so long as the voltage level of the DC output of the rectifier bridge 18 is above this minimum operating level, the output of the three bridges 22, 24 and 26 is shorted through the transistor Q1, and the capacitor C2 is maintained in a discharged condition. Also, since the secondary windings of the transformers T4, T6, T8, are substantially shorted except for the forward voltage drops across the diodes of the respective bridges 22, 24, 26, and the collector to-emitter voltage drop of the transistor Q1, there is very little burden added to the current transformer secondary circuit, to detrimentally affect the accuracy of the current sensing elements of the breaker control circuits 12 supplied by the same current transformers.

Should the voltage level of the DC output of the bridge 18 drop below the preselected minimum level, the zener diode Z1 ceases to conduct, and the transistor Q1 is turned off to allow the capacitor C2 to be charged to a voltage level determined by the resistor R1. Under normal line conditions, the voltage level to which the capacitor C2 is charged is below the level at which the zener diode Z2, connected between the positive side of the capacitor C2 and the gate of the silicon controlled rectifier CR1, will conduct. However, when an overcurrent or fault condition occurs on the distribution line downline from the circuit breaker 10, the capacitor C2 will be charged at a rate determined by both the capacitor C2 and the resistor R1 to the operating voltage level of the zener diode Z2, which then conducts and applies a current signal to the gate of the controlled rectifier CR1 to switch this control rectifier CR1 to its conducting state. When the controlled rectifier CR1 is switched on, the capacitor C2 is discharged through the blocking diode D2, the closed auxiliary contact 10a, the breaker trip coil 20, and the controlled rectifier CR1 to ground. The capacitor C2 is selected so that when it is discharged through the trip coil 20, the current flow there through will be sufficient to trip the circuit breaker.

So long as the voltage level of the DC output of the bridge 18 is above the minimum operating level determined by the zener diode Z1, the transistor Q2 remains switched on by the current signal supplied to its base by the undervoltage sensing circuits 28. Also, the operating coil of the relay 13, which is connected across the DC voltage output of the rectifier bridge 18 through the transistor Q2, remains energized, and the normally open relay contact 13a remains closed. Under these conditions, when the circuit breaker 10 is open, it can be closed by actuating the breaker closing control circuit 20 of the breaker control circuits 12 to provide a positive D.C. potential at the breaker close terminal C and thus energizing the operating coil of the breaker closing relay 16 connected between this terminal C and ground. When the operating coil of the breaker closing relay 16 is energized, the normally open relay contacts 16a are closed and the breaker closing coil 14 is connected across the secondary winding of the power supply transformer T10 through the closed auxiliary contacts 10b of the circuit breaker 10, and the closed contacts 13a, and 16a of the relays 13 and 16. When the circuit breaker 10 closes, the normally closed auxiliary contacts 10b open to de-energize the breaker closing coil 14.

When the circuit breaker 10 is open, and the voltage level of the DC outputs of the rectifier bridge 18 is below the minimum operating level determined by the zener diode Z1, no current signal will be supplied by the undervoltage sensing circuit 28 to the base of the transistor Q2, the transistor Q2 will be switched off, the operating coil of the relay 13 will be de-energized, and the normally open contact 13a of the relay 13 will be open, to thus prevent the breaker closing coil 14 from being energized so long as the normal DC power supplied by the rectifier bridge 18 remains below its predetermined minimum operating level.

If desired, the undervoltage sensing circuit 28 can be used to activate an alarm to indicate failure of the normal DC control power source. For example, a normally closed contact 13b of the relay 13 can be connected to activate an alarm circuit whenever this relay 13 is de-energized.

Figure 2:
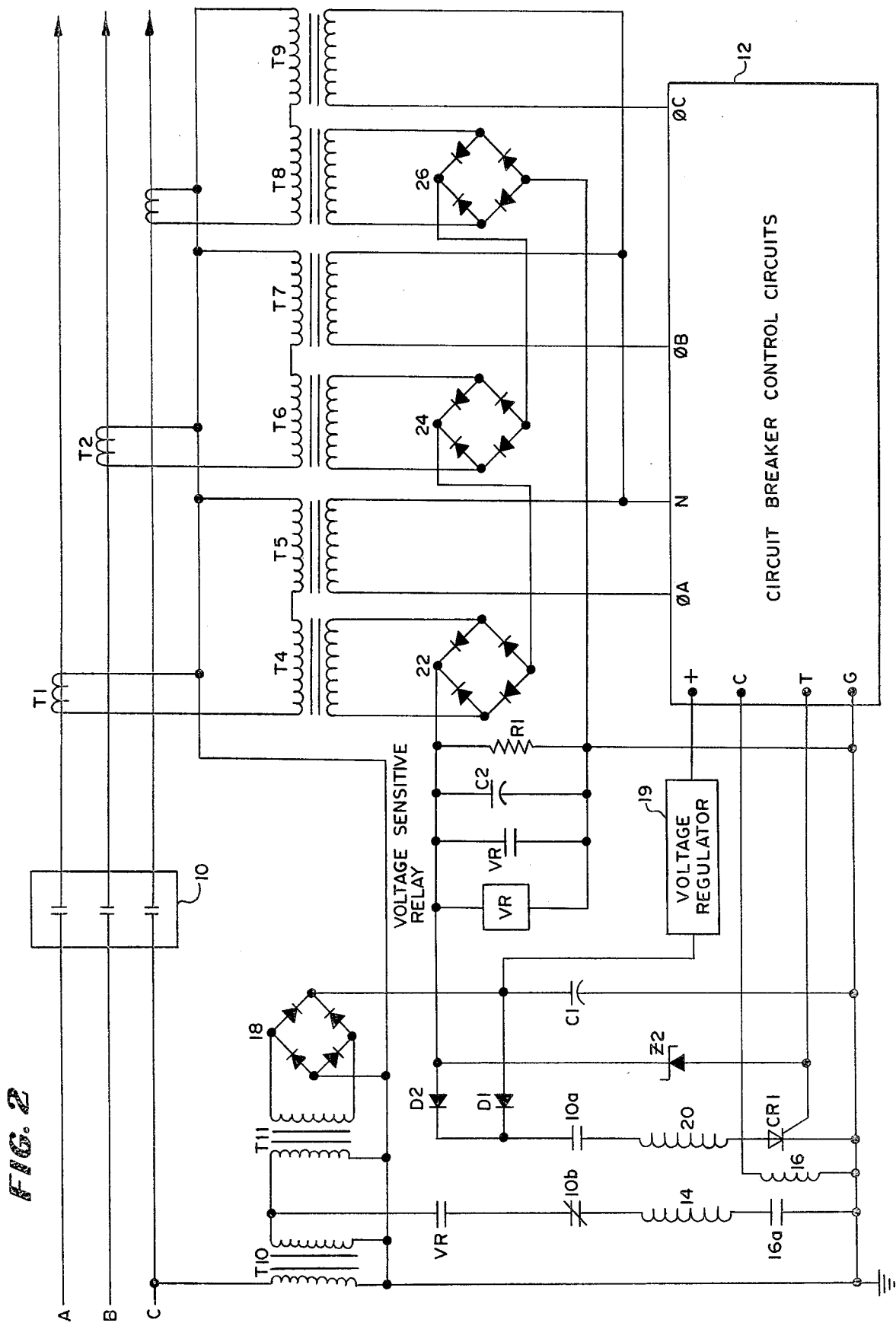
FIG. 2 is a schematic wiring diagram of an alternate embodiment of the invention.

Also, a voltage sensitive relay, similar to that described in the above-referenced U.S. Pat. No. 3,590,325, can be used instead of the undervoltage sensing circuit 28, the transistors Q1 and Q2, and the relay 13. In such a case, a normally open contact of the voltage sensitive relay would be connected across the capacitor C2 instead of the transistor Q1, and another normally open contact of this voltage sensitive relay would be connected to the breaker closing circuit in place of the normally open contact 13a of the relay 13, as shown in FIG. 2. Also, a normally closed contact of this voltage sensitive relay could be used to activate an alarm indicating the failure of the normal DC voltage supply.

Many modifications of the particular embodiment of the invention described herein are possible without departing from the spirit and scope of the invention. For example, the rectifier bridges 22, 24 and 26 may be connected directly into the secondary circuit of a respective current transformer T1, T2, T3, as shown in the referenced U.S. Pat. No. 3,805,455. Similarly, the overcurrent pickup circuits can be directly coupled to the current transformers T1, T2, T3, rather than through the transformers T5, T7, T9, as shown in the referenced U.S. Pat. No. 4,027,203. Therefore, it is accordingly intended that the scope of the invention is not to be limited by the specific embodiment disclosed.

What is claimed is:

1. In a circuit breaker for a protected alternating electric circuit which includes separable contacts, operating means for opening and closing said contacts, a trip coil for actuating said operating means to open said contacts when said trip coil is energized, a trip switch which is rendered conductive by a triggering signal for energizing said trip coil from a normal direct current power source, a normal trip control circuit energized from said normal direct current power source and coupled to said protected circuit for generating said triggering signal for said trip switch upon the occurrence of a predetermined overcurrent condition in at least one phase of said protected circuit, and said normal direct current power source, a combination backup trip control circuit and direct current power source comprising:

current sensing means coupled to said protected circuit, for producing a direct current signal having an instantaneous peak value each half cycle proportional to the instantaneous peak value of the maximum phase current of said protected circuit;

a resistor-capacitor network, connected across said current sensing means to receive said direct current signal, and comprising at least one capacitor and one resistor connected across said capacitor;

rectifier means disposed between the series combination of said trip coil and said trip switch and both said normal power source and said resistor-capacitor network, to allow current flow from either said normal direct current power source or said resistor-capacitor network through said trip coil when said trip switch is rendered conductive, but to block current flow between said normal direct power source and said resistor-capacitor network;

a first voltage sensing means, connected to sense the voltage level of said normal direct current power source, for actuating a first normally open switching means, when ever the voltage level of said normal direct current source exceeds a predetermined level;

said first switching means, connected across said resistor-capacitor network, for shorting said network when actuated by said first voltage sensing means; and a second voltage sensing means, connected to sense the voltage across said resistor-capacitor network, and coupled to said trip switch, for generating said triggering signal for said trip switch whenever the voltage level of said resistor-capacitor network exceeds a predetermined level.

2. A combination backup trip control circuit and direct current power source for a circuit breaker as described in claim 1, wherein: said trip switch comprises a silicon controlled rectifier and said second voltage-sensing means comprises a zener diode connected between said resistor-capacitor network and the gate of said silicon controlled rectifier.

3. A combination backup trip control circuit and direct current power source for a circuit breaker, as described in claim 1, wherein:
said first switching means comprises a transistor having its collector connected to the positive side of said resistor-capacitor network, and its emitter connected to the negative side of said resistor-capacitor network; and
said first voltage sensing means comprises a zener diode connected between the positive side of said normal direct current power source and the base of said transistor to turn on said transistor whenever the voltage of said normal direct current power source exceeds the voltage rating of said zener diode.

4. A combination backup trip control circuit and direct current power source for a circuit breaker, as described in claim 1, wherein:
said first voltage sensing means and said first switching means is a voltage-sensitive relay, connected to sense the voltage level of said normal direct current power source, having normally open contacts connected across said resistor-capacitor network.

5. A combination backup trip control circuit and direct current power source for a circuit breaker, as described in claim 1, wherein:
said protected circuit is a three-phase circuit, and said current sensing means comprises:
three current transformers, each coupled to a respective phase of said protected circuit; and
three single phase full wave rectifier bridges, each having alternating current inputs coupled to a respective one of said current transformers and direct current outputs connected in series with the direct current outputs of the other two rectifier bridges across said resistor-capacitor network.

6. A combination backup trip control circuit and direct current power source for a circuit breaker, as described in claim 5, wherein:
said normal trip control circuit is coupled to said protected circuit by said three current transformers.

7. A combination backup trip control circuit and direct current power source for a circuit breaker, as described in claim 1, wherein said rectifier means comprises:
a first diode, connected between said trip coil and a positive polarity of said normal direct current power source, for allowing current flow from said normal direct current power source to said trip coil; and
a second diode, disposed between said trip coil and a positive polarity of said resistor-capacitor network, for allowing current flow therethrough from said resistor-capacitor network to said trip coil.

8. A combination backup trip control circuit and direct current power source for a circuit breaker, as described in claim 1, which further comprises:
a close coil for actuating said operating means to close said contacts;
a close switch for controlling the energization of said close coil;
a second, normally open switching means, actuated by said first voltage sensing means and connected in series with said close coil and close switch, for preventing the energization of said close coil unless the voltage level of said normal direct current power source exceeds a predetermined level; and
an electric power source for energizing said close coil.

9. A combination backup trip control circuit and direct current power source for a circuit breaker, as described in claim 8, wherein:
said first switching means comprises a first transistor having its collector connected to the positive polarity of said resistor-capacitor network, and its emitter connected to the negative polarity of said resistor-capacitor network;
said second switching means comprises a relay having normally open contacts connected in series with said close coil and an operating coil connected between the positive polarity of said normal direct current power source and the collector of a second transistor, and said second transistor, which has its emitter connected to the negative polarity of said normal direct current power source; and
said first voltage sensing means comprises a zener diode connected between the positive polarity of said normal direct current power source and the bases of said first and second transistors, to turn on said transistors whenever the voltage of said normal direct current power source exceeds the voltage rating of said zener diode.

10. A combination backup trip control circuit and direct current power source for a circuit breaker, as described in claim 8, wherein:
said first voltage sensing means, and said first and second switching means comprises a voltage sensitive relay, connected to sense the voltage level of said normal direct current power source, having a first set of normally open contacts connected across said resistor-capacitor network, and a second normally open set of contacts connected in series with said close coil.

11. A circuit breaker for protected alternating electric circuit, which comprises:
separable contacts;
operating means for opening and closing said contacts;
a trip coil for actuating said operating means to open said contacts when said trip coil is energized;
a trip switch, which is rendered conductive by a triggering signal, for energizing said trip coil from a normal direct current power source through a first blocking diode and from a backup direct current power source through a second blocking diode, said first and second blocking diodes being connected to block current flow between said normal and backup direct current power sources;
said first and second blocking diodes:
a normal trip control circuit, energized from said normal direct current power source and coupled to said protected circuit, for generating said triggering signal for said trip switch upon the occurrence of a predetermined overcurrent condition in at least one phase of said protected circuit;
a backup trip control circuit, coupled to and energized from said protected circuit, for generating said triggering signal for said trip switch upon the occurrence of a predetermined overcurrent condition in at least one phase of said protected circuit, said backup trip control circuit also comprising said backup direct current supply source for energizing said trip coil through said second blocking diode when said trip switch is rendered conductive; and voltage sensing means, coupled to sense the voltage level of said normal direct current power source, and including a shorting switch connected across the direct current outputs of said backup trip control circuit and backup direct current power source, for closing said shorting switch whenever the voltage level of said normal direct current source exceeds a predetermined level.

12. A circuit breaker, as described in claim 11, which further comprises:

a close coil for actuating said operating means to close said contacts;

a close switch for energizing said close coil from an electric power source through a normally open switching means activated by said voltage sensing means;

said switching means, which is closed by said voltage sesing means whenever the voltage level of said normal direct current source exceeds a predetermined level, for preventing energization of said close coil when the voltage level of said normal direct current power source is less than said predetermined level; and said electric power source for energizing said close coil.

* * * * *